United States Patent [19]

Chevreux et al.

[11] Patent Number: 4,717,739
[45] Date of Patent: Jan. 5, 1988

[54] RADIATION CURABLE CLEAR URETHANE ACRYLATE ADHESIVE WITH ACRYLIC ACID MONOACRYLATES, AND OPTIONAL MULTIACRYLATE

[75] Inventors: Pierre Chevreux; Christiane A. R. Chevreux, both of Ferney-Voltaire, France

[73] Assignee: Deltaglass S.A., Fribourg, Switzerland

[21] Appl. No.: 548,436

[22] Filed: Nov. 3, 1983

[30] Foreign Application Priority Data

Nov. 5, 1982 [GB] United Kingdom ................ 31736

[51] Int. Cl.⁴ .................... C08F 2/50; C08F 26/00; C08F 20/06; B32B 27/16
[52] U.S. Cl. ........................ 522/79; 156/99; 428/425.6; 428/424.6; 522/14; 522/93; 522/96; 522/97; 525/920; 526/301; 524/764
[58] Field of Search ............... 204/159.19; 522/96, 522/79

[56] References Cited

U.S. PATENT DOCUMENTS

| | | | |
|---|---|---|---|
| 3,700,643 | 10/1972 | Smith | 204/159.15 |
| 3,709,866 | 1/1973 | Waller | 204/159.23 |
| 3,860,505 | 1/1975 | Tarney | 204/159.12 |
| 3,862,021 | 1/1975 | Hagihara | 204/159.15 |
| 3,931,678 | 1/1976 | O'Sullivan | 204/159.23 |
| 4,082,634 | 4/1978 | Chang | 204/159.14 |
| 4,088,618 | 5/1978 | Saltzman | 204/159.12 |
| 4,108,840 | 8/1978 | Friedlander | 528/46 |
| 4,165,265 | 8/1979 | Nakabayashi | 204/159.14 |
| 4,239,866 | 12/1980 | Reitel | 204/159.15 |
| 4,297,185 | 10/1981 | Chevreux | 204/159.19 |

Primary Examiner—John C. Bleutge
Assistant Examiner—A. H. Koeckert
Attorney, Agent, or Firm—Browdy and Neimark

[57] ABSTRACT

Radiation curable composition suitable for use as an adhesive for bonding glass, especially for the production of clear glass laminates, and comprising a urethane acrylate component in an $\alpha\beta$-ethylenically unsaturated diluent which comprises (i) acrylic acid, (ii) a monoester of acrylic acid and a $C_{1-6}$ alkanol or substituted derivative thereof said monoester being present in an amount of up to 400% by weight of component (i), and optionally (iii) up to 40% by weight of multiacrylate.

32 Claims, No Drawings

RADIATION CURABLE CLEAR URETHANE ACRYLATE ADHESIVE WITH ACRYLIC ACID MONOACRYLATES, AND OPTIONAL MULTIACRYLATE

FIELD OF INVENTION

This invention relates to radiation-curable compositions suitable for use as adhesives for bonding glass, and in particular for the manufacture of clear glass laminates.

BACKGROUND OF INVENTION

There have been many proposals in the literature for such compositions. In general they comprise a viscous or solid radiation-curable ethylenically unsaturated macromolecular or resinous, e.g. oligomer or polymer component dissolved or dispersed in a liquid diluent comprising one or more ethylenically unsaturated monomers which are capable of copolymerising with the said component.

To be commercially acceptable as an adhesive for bonding glass in large scale manufacturing operations such as the manufacture of laminated glass products, the compositions must not only bond adequately in the cured state to the glass and to the other substrate, which may or may not be glass, but must also have an adequate shelf life and yet be able to be cured rapidly when exposed to the chosen irradiation, and must be available in a form having a viscosity sufficiently low in the uncured state to permit its facile application to a substrate in a thin and uniform layer without the need for sophisticated equipment.

For the production of laminated glass products intended to be used as windows or doors or in vehicles, the cured product from the composition must also be clear, colourless and transparent, preferably have a refractive index at least close to that of glass, exhibit adequate water- or moisture-resistance and be resistant to aging in sunlight. Further, since for many intended end uses it is desirable that at least one of the layers of the laminate is an organic glass such as methacrylate or polycarbonate or that a plastics foil such as of vinyl chloride polymer be provided between two glass sheets (one or both of which may be of organic glass), it is also desirable for the composition to bond well to certain plastics materials, especially those that are available as transparent sheets or film.

Much effort has been expended over the last 10–15 years in developing suitable compositions and a very wide variety of resinous components and diluent compositions has been proposed in the literature. One group of resins that has attracted particular interest comprises those which contain urethane groups in an oligomer or polymer chain and particular examples of these are the compounds obtainable by reacting a polyol with a polyisocyanate to form a urethane intermediate having terminal hydroxy and/or isocyanate groups and reacting the intermediate with an αβ-ethylenically unsaturated compound having a group which is reactive with a hydroxy or isocyanate group as appropriate. Where the unsaturated compound contains a carboxylic group attached to a carbon atom of the αβethylenically unsaturated group, i.e., contains the group

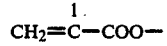

the product, which will usually be oligomeric, is called, for ease of reference, a urethane acrylate.

One class of composition that has shown particular promise as an adhesive for glass contains a urethane acrylate as the resinous component and a reactive diluent such as acrylic acid, e.g. as described in European patent publication No. 10355. However, an improvement in the bond obtained between glass and plastics materials, especially vinyl chloride polymers, using the composition would be desirable. In the production of glass laminates, two properties of the bond which are important are the adhesive or bond strength, e.g. as measured in a Peel Test, and the performance of the bond under impact. The latter can be gauged from the performance of the bond in the Peel Test. If the force required when performing the Peel Test at a steady parting rate of e.g. 30 cm/minute is not uniform and/or if it drops markedly if the parting rate is increased sharply, e.g. as when the components are pulled apart sharply by hand, the bond is said to exhibit "driness" and is less likely to perform well under impact; in particular, delamination and/or splintering of the glass may occur. It is in these properties of bond strength and driness in particular where improvement is desired; i.e. an increase in bond strength and/or a reduction in "driness" which can alternatively be described as an increase in the "softness" of the bond. Of course, such improvement should be obtained without unacceptable deterioration of other properties, particularly clarity, colour, reactivity, water-resistance and resistance to ultra-violet light. To improve the bond, without significant loss of water-resistance in particular, however, presents a problem because these properties conflict. Adhesion to glass requires a degree of hydrophilicity whereas hydrophobicity is required for water resistance.

SUMMARY OF INVENTION

According to the present invention, we have found that an improvement in one or both of the above properties of the bond is obtained if the diluent also includes a limited amount of a mono acrylate of specified kind.

Thus, in accordance with the present invention, there is provided a radiation-curable fluid adhesive composition for the production of clear glass laminates and of the kind comprising (A) a urethane acrylate composition in (B) a liquid αβ-ethylenically unsaturated diluent component, wherein said diluent component comprises (i) acrylic acid, (ii) an effective amount of at least one acrylate selected from monoesters of acrylic acid and alkanols having from 1 to 6 carbon atoms and substituted derivatives of such alkanols, preferably containing only carbon, hydrogen and oxygen atoms, said component (ii) being present in an amount up to 400% by weight of component (i) and (iii) from 0% to about 40% by weight of a multiacrylate.

By "effective" is meant that the amount improves one or both of the above-mentioned properties of a bond obtained by curing the composition, i.e. an improvement in bond strength and/or a reduction in "driness".

The acrylate component of the diluent may be an acrylate of an alkanol having 1 to 6 carbon atoms or a substituted derivative of such an alkanol, which substituent preferably contains only carbon, hydrogen and oxygen atoms e.g. as in alkyl-, alkoxyalkyl-, epoxyalkyl and hydroxyalkyl-acrylates. A mixture of such acrylates may also be used.

Examples of suitable acrylates are ethyl acrylate, n-butyl acrylate, glycidyl acrylate, 2-ethoxyethyl acrylate and 2-hydroxyethyl acrylate. Because of the volatility of the lower alkyl acrylates, it is preferred that the alkanol have at least 3 carbon atoms. Alkanols having over 6 carbon atoms, on the other hand, do not appear to give the desired improvement in the bond. Preferably the alkanol will have the structure

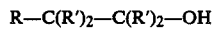

$$R-C(R')_2-C(R')_2-OH$$

wherein R is —H, —OH or a monovalent organic group containing atoms selected only from carbon, oxygen and hydrogen, and having not more than 4 atoms in a chain attached to the free valency, and each R' is individually selected from —H and —$CH_3$, or R and R' together may form a divalent group containing atoms selected only from carbon, oxygen and hydrogen, the sum of the carbon and oxygen atoms in said alcohol being from 4 to 7.

n-Butyl acrylate is particularly preferred because compositions can be formed therefrom which have not only good bond strength and low driness but also excellent water- and ultra-violet resistance and fast cure rates.

As evidenced by detailed experiments carried out with the preferred acrylate, improvements in bond strength are observed as the amount of acrylate employed increases up to about 40 or even 45% by weight, based on the combined weight of acrylate and acrylic acid. Beyond this level the acrylate may have an adverse effect on the bond strength but initially this is more than offset by a reduction in the "driness" of the bond so that amounts up to as much as 80% by weight, based on the combined weight of acrylic acid and acrylate, are acceptable. Beyond this level, however, the bond strength is generally too low. Preferred amounts are in the range about 10% to about 70% but at concentrations below about 20% to 25% by weight, the improvement is not very great and therefore a more preferred range is 20% or 25% to 70%, still more preferably about 20% or 25% to about 65%. The preferred amount may vary with the nature of the acrylate and the nature of the urethane acrylate but in general it is desired that the bond strength of the adhesive is at least 300 g/cm, preferably at least 500 g/cm and most preferably at least 1000 g/cm, and that the bond has a "driness", determined as described below, of at least "B", and preferably "C" and the most preferred range is about 35% or 40% to about 60 or 65% of acrylate, based on the combined weight of acrylate and acrylic acid in the diluent.

Where the composition is intended for use in the production of transparent laminates, not all of the specified acrylates may be suitable for use with all urethane acrylate compositions; some combinations tend to give rise to a lack of clarity in the cured material. In some cases where turbidity has been observed in the uncured composition, this has disappeared in the cured material but whether a particular combination of urethane acrylate and monoethyl acrylate is suitable can readily be determined by simple experiment.

The urethane acrylate component, may comprise one or a mixture of urethane acrylates which are preferably oligomeric. The nature of the urethane acrylate component and its concentration in the composition are important factors in the reactivity of the composition, the adhesive strength of the bond formed therefrom and the flexibility of a film of the cured composition. This last property is important where the composition is to be used to form a laminate from materials having different thermal expansion coefficients and also affects the flexural strength and impact resistance of laminates. Increasing the concentration generally leads to an improvement in reactivity and adhesive strength but also increases the viscosity thereby making the composition less easy to apply. Preferably the urethane acrylate will form about 45 to about 75% by weight of the composition, more preferably about 50 to about 70%.

Urethane acrylates are notionally obtainable by the reaction of a polyol and a polyisocyanate to form an oligomeric intermediate which is preferably oligomeric in nature and which has hydroxy or isocyanate end groups, followed by reaction of this intermediate with an $\alpha\beta$-ethylenically unsaturated compound which has the structure

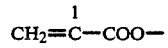

$$\overset{1}{CH_2}=C-COO-$$

and is reactive with an isocyanate group or hydroxy group as appropriate. Usually the polyol will be reacted with excess polyisocyanate to yield an oligomeric intermediate containing free isocyanate groups which are then reacted with an $\alpha\beta$-ethylenically unsaturated compound of the above kind having a group which is reactive with the isocyanate group, e.g. a hydroxyl group. In general, the $\alpha\beta$-ethylenically unsaturated compound will be a hydroxy ester of acrylic acid or $\alpha\beta$-substituted derivative thereof such as methacrylic acid, e.g. a hydroxyalkyl acrylate or methacrylate of which hydroxyethyl and hydroxypropyl acrylates and methacrylates are the most common examples, especially the acrylates. Either the polyisocyanate or, more usually, the polyol, will generally be oligomeric in order to achieve the desired level of molecular weight ($M_N$) in the urethane acrylate, which will normally be in the range about 500 to about 10,000, more usually about 800 to about 8000, and especially about 1000 to about 7000. As the bond strength of the adhesive appears to suffer at lower molecular weights, it is generally desirable for the urethane acrylate component to be formed at least mainly of oligomeric material having a molecular weight above 1500, more preferably above 2000–3000, e.g. at least 4000. The term molecular weight as used herein refers to number average molecular weight ($M_N$) expressed in terms of polystyrene equivalent as measured by, for example, Gas Phase Chromatography (GPC).

The processes most usually employed to produce the urethane acrylates generally yield mixtures of oligomers, and these mixtures may also include in minor amounts monomeric reaction by-products such as the reaction products of the polyisocyanate or the polyol with the $\alpha\beta$-ethylenically unsaturated compound. These mixtures or fractions thereof may be used as such in the compositions of the present invention.

In general it is desired that the urethane acrylate component comprise at least mainly, and preferably largely, material having a functionality, meaning number of $\alpha\beta$-ethylenically unsaturated groups per molecule, of at least about 2. Usually it will be preferred to have on average about two, e.g. from about 1.5 to about 2.5, preferably about 1.7 to about 2.3, such groups per molecule.

The chemical nature of the urethane acrylate component also affects the properties of the composition and particularly the resistance to water and to u.v. irradiation of the adhesive layer obtained from the composition in a laminate. We have found that the better results are obtained where the urethane acrylate is derived at least mainly from polyol which contains ether groups, e.g. as in polyether polyols and polyetherester polyols.

Best results have been obtained where at least the major part of the urethane acrylate component comprises urethane acrylate derived from polyol which is at least mainly polyether polyol e.g. a polymer of ethylene oxide and/or propylene oxide, and which preferably is free or substantially free of ester groups.

The polyisocyanates may be aromatic, e.g. as in phenylene diisocyanates, toluene diisocyanates and bis-(isocyanatoaryl)-alkanes. However, it is preferred that most and preferably all or substantially all of the isocyanate groups of the polyisocyanate are attached to aliphatic carbon atoms, e.g. as in polymethylene, e.g. hexamethylene diisocyanates, bis(isocyanatomethyl)cyclohexanes, bis(isocyanatocycloalkyl)alkanes e.g. bis-(isocyanatocyclohexy)methanes and isophorone diisocyanate.

It is preferred that all or substantially all of the unsaturation in the urethane acrylate component of the composition is terminal $\alpha\beta$ unsaturation.

It has been observed that an improvement in the "softness" (i.e. reduction in the "driness") of the bond can be obtained, especially where the amount of acrylic acid exceeds the amount of acrylate in the diluent, if the urethane acrylate comprises a mixture having, preferably as the main component, (a) generally difunctional urethane acrylate material which preferably contains ether groups in the oligomer or polymer chains and which also contains, preferably in a minor amount, (b) urethane acrylate which has a functionality of at least about 3 and a molecular weight $M_N$ above 1200. An increase in bond strength, which can be substantial, is also observed in many cases. Preferably, the molecular weight is at least about 1300, more preferably at least about 1500 and most preferably at least about 2000.

Preferably the main component comprises urethane acrylate containing about two e.g. about 1.7 to about 2.3, preferably about 1.8 to about 2.2 $\alpha\beta$-ethylenically unsaturated groups per molecule, and derived from polyol which is at least mainly and preferably entirely or substantially entirely polyether polyol and is preferably free or substantially free of ester groups.

The polyol material from which component (b) is derived, on the other hand, and which may be one or a mixture of polyols, may be at least mainly polyester polyol; i.e. polyol wherein the oligomer chains comprise repeating ester groups. In fact, very good results are obtained when the polyol is derived from lactone, especially a caprolactone by which is meant a lactone having 7 atoms, including the oxygen atom, in the lactone ring, the free valencies of the ring carbon atoms generally being satisfied by hydrogen atoms although substitution by lower alkyl groups having one to four carbon atoms may also be tolerable.

In both components, the isocyanate groups of the polyisocyanate are preferably at least mainly attached to aliphatic carbon atoms.

Component (b) is effective in even quite small amounts, e.g. when it forms 1% or even less of the total urethane acrylate component. As the amount of this component in the urethane acrylate is raised, the improvement gained appears to continue to increase to a maximum but thereafter commences to decrease. Also, the presence of large amounts appears to have an adverse effect on other properties such as water resistance. It is therefore preferred that component (b) forms no more than a minor amount of the urethane acrylate material. Best overall results are generally obtained when component (b) forms from about 0.5% to about 30%, preferably from about 0.8% to about 20%, more preferably from about 1% to 15% and most preferably from about 3% to about 15% of the urethane acrylate, by weight.

The composition may, if desired, contain other materials in addition to the urethane acrylate, acrylic acid and specified acrylate, and these may be polymerisable or non-polymerisable.

For example, a resinous or polymeric material in addition to the urethane acrylate may also be present. Such material may be unsaturated, e.g. as in $\alpha\beta$-ethylenically unsaturated polyesters, but preferably will be at least substantially saturated e.g. as in epoxy resins, especially those derived from epichlorhydrin and bis-phenols such as bis-phenol A. Such additional resinous material will not normally form more than about 50% by weight of the total composition, however.

The inclusion of balsamic resins is particularly preferred as they increase the resistance of the cured compositions to yellowing with age, even at quite low concentrations such as 2.5% by weight of the total composition. Examples of such resins are the high molecular weight alcohols obtained by the hydrogenation of resinic acids and described generically as hydroabietyl alcohols, such as those marketed under the Trade Name "ABITOL", and esters such as the triethylene glycol esters and hydrogenated methyl esters of colophony, such as those marketed under the Trade Names "HERCOLYN" and "STAYBELITE". In general sufficient protection is obtained with the use of 5% of the resin and little further benefit is obtained by exceeding 10% although larger amounts may be used if desired.

In accordance with a further aspect of the present invention, therefore, there is provided a radiation curable urethane acrylate composition which includes an age-improving amount of a balsamic resin which is preferably present in an amount of at least 0.5%, e.g. from 1 to 50%, by weight, of the composition.

The diluent may, if desired, also include one or more, $\alpha\beta$-ethylenically unsaturated compounds in addition to the acrylic acid and specified acrylate, e.g. to adjust the viscosity or reactivity of the composition. Particular examples of such additional components are other $\alpha\beta$-ethylenically unsaturated acids, e.g. methacrylic acid or $\alpha$-cyanoacrylic acid; acrylates other than the specified acrylates, e.g. aminoacrylates, monomeric urethane acrylates and esters of acrylic acid with alkanols having 8 or more carbon atoms; methacrylates; multiacrylates and other $\alpha\beta$-ethylenically unsaturated compounds. However, in general it is found that the better overall combinations of properties of the composition, especially in respect of bond strength, water- and u.v.-resistance, and rate of cure, are obtained as the total combined amount of acrylic acid and specified acrylate in the diluent is increased. It is thus preferred that at least about 50% by weight of the $\alpha\beta$-ethylenically unsaturated acid content of the diluent is acrylic acid and that the acrylic acid and specified acrylate together form at least about 50% by weight of the diluent and preferably substantially more.

The presence of multiacrylates (i.e. the di- or higher esters of acrylic acid with polyhydric alcohols such as neopentylglycol diacrylate, trimethylolpropane triacrylate and pentaerythritol tri- and tetra-acrylate), can also be tolerated. However, the bond strength of the composition appears to increase with decrease in the amount of multiacrylate present and while amounts thereof up to 40% by weight of the diluent can be accepted, smaller amounts are preferred e.g. not more than 30% and more preferably not more than 20% of the diluent, by weight.

It has further been found that the inclusion of $\alpha\beta$-ethylenically unsaturated compounds capable of forming salts with acrylic acid e.g. N,N-dialkyl amino alkyl esters, can lead to haziness in the cured product which becomes significant if such a compound is employed in amounts of about 5% by weight or more of the total composition. Preferably, therefore, such compounds are employed in amounts of less than about 5%, preferably less than about 2.5% by weight of the composition. Most preferably, the composition is free or substantially free of such compounds.

While the invention is directed to compositions that may be cured by radiation at large, e.g. ionising radiation, particulate or non-particulate and non-ionising radiation, it is particularly concerned with photopolymerisable compositions such as may be cured by exposure to ultra-violet radiation. Such compositions will normally also contain a photoinitiator. Any suitable photoinitiator may be used but where the composition is to be used in the production of clear laminated glass products, the photoinitiator should not introduce discolouration into the composition. Good reactivity, colour, water-resistance and adhesion are obtained using benzophenone but many possible alternatives are suggested in the art. The photoinitiator is preferably employed in an amount of about 0.5 to about 10% by weight of the basic composition, most preferably about 1 to about 5%.

The u.v. irradiation period required to achieve the polymerisation of the adhesive is directly related to the time after which the minimum dose of radiation of proper wavelength has been absorbed by the adhesive layer. It therefore depends on the spectral distribution of the source, the power thereof, the distance thereof from the substrate to be irradiated and the optical transmission of that layer of the substrate which must be penetrated by the light before reaching the adhesive itself. Thus, glass and synthetic resins all have some significant extinction coefficient in the u.v. range and, consequently, the irradiation duration must be adapted to the optical properties of each material used.

As u.v. irradiation sources, any having an emission spectrum largely comprised above 0.3 u is convenient, e.g. mercury vapor lamps. One or more lamps of 20 W to about 10 KW can be used, e.g. a 2 kW lamp of type HTQ7 made by PHILIPS or a high-pressure mercury vapor lamp giving 80 W/cm made by HANOVIA. Argon or krypton lamps can also be used.

Preferably, the polymerisation is carried out only by irradiation with no further heat than that resulting from the light source. In general, it is not necessary that such heat be removed, e.g. by cooling. In general, cure can be completed within a few seconds.

The thickness of the adhesive layer, expressed in grams per unit surface area, can be between about 5 and about 100 g/m$^2$ or even exceed such limit. Best adhesion results, especially when the laminate is subjected to long exposures to moisture, are obtained when using about 15 to about 60 g/m$^2$ of the adhesive.

To be suitable for use with conventional dispensing and spreading machinery for liquid materials, it is desirable for the compositions to have a viscosity of less than about 2000 cp and preferably in the range about 300 to about 1200 cp, more preferably about 500 to about 1000 cp, measured at 20° C. on a Brookfield LV viscometer with a No. 1 spindle at 6 rpm.

By means of the invention, it is possible to obtain a u.v.-radiation curable adhesive composition comprising urethane acrylate and an $\alpha\beta$-ethylenically unsaturated diluent therefor, and having a very desirable combination of viscosity in the uncured state, reactivity in terms of time to cure when exposed to a source of u.v. radiation, and bond strength, water-resistivity, u.v.-resistivity colour and clarity when cured. In particular, there can be obtained compositions having a viscosity of 1200 cp or less, measured using a Brookfield LV viscometer with a No. 1 spindle at 6 rpm at 20° C., and a cure time, as herein defined, of 30 seconds or less, and which cure to a clear and colourless adhesive layer having a bond strength of at least 500 g/cm, a water-resistance of at least 4 and u.v.-resistance of 0, where bond strength, water-resistance and u.v.-resistance are all as defined herein.

In accordance with a further embodiment of the invention, there is provided a method of producing a clear glass laminate which involves bonding a first sheet of glass to a second sheet which is selected from glass sheets and clear plastics sheets using an adhesive, and wherein as adhesive there is used the composition in accordance with the present invention and the assembly of sheets with a layer of said adhesive composition therebetween is exposed to irradiation to cure the adhesive and bond the sheets together.

A particularly important feature of the invention is that it enables the replacement of the polyvinylbutyral conventionally employed as an interlayer in safety glass laminates by alternative plastics materials which perform better at elevated temperatures, especially at temperatures of 40° C. or more at which polyvinyl butyral tends to lose much of its strength. A particular example is vinyl chloride polymer e.g. polyvinyl chloride.

Thus, in accordance with yet another embodiment of the invention, a method is provided for producing a clear glass laminate in which one face of a clear plastics foil or film interlayer is bonded to a glass sheet and the other face is bonded to a second sheet which is selected from glass sheets and clear plastics sheets, wherein the bonding of at least said glass sheet to said interlayer is effected by means of an adhesive composition in accordance with the present invention and the assembly of glass sheet and interlayer with a layer of said adhesive composition therebetween is exposed to irradiation to cure the adhesive and bond the sheet and interlayer together.

DESCRIPTION OF EXAMPLES

The invention is now illustrated by the following Examples in which all parts are expressed by weight unless otherwise indicated.

In these Examples, water resistance, u.v. resistance, bond strength and cure time were measured as follows:

Water Resistance: an excess of the composition is applied to one face of a 50×25×4 mm glass plate. A second glass plate having the same dimensions is then pressed on the coated surface and the excess adhesive expressed from the edges of the assembly is wiped off. After curing, the assembly is immersed in boiling water for 3 hours. The sample is then withdrawn, dried and examined and the degree by which the adhesive layer has been affected is measured on the scale 0-7 determined as follows:

7 no effect;
6 slightly affected at corners of sample only;
5 very narrow band affected around periphery of sample;
4 affected band not exceeding about 2.5 mm wide around periphery parallel to sides;
3 width of affected areas extending up to 5 mm in from sides of sample;
2 width of affected areas extending up to 8 mm in from sides of sample;
1 seriously affected: only small area in middle of sample left unaffected;

The affected area is characterised by the presence of one or more of the following: bubbling and/or blisters, striations and the presence of interference colours.

U.V. Resistance: To each of the two long edges of one face of a 50×25×4 mm glass plate is fixed a 1-2 mm wide spacer strip 1 mm thick. An excess of the composition is disposed between the spacers and a second 50×25×4 mm glass plate is pressed on top. After curing the composition, the whole assembly is exposed to irradiation at 50°-65° C. from a Hanau 160 watt u.v. lamp placed 25 cm from the sample. The u.v. resistance is estimated from the degree to which the adhesive layer has become discoloured after 63 hours exposure and is recorded on the scale 0-5 where 0 means there has been no observable colour change, 5 means a deep yellow colour has developed and numerals 4 to 1 relate to progressively lighter yellow colours.

Bond strength was measured by a Peel Test according to ASTM D 1876-69. A 4×40×100 mm glass plate is bonded to a 40×165 mm sample of pvc film, e.g. storey's VIBAK VB 24, using a sample of the composition. The pvc film is then cut to produce a centrally disposed 25 mm wide band and the lateral bands are removed to avoid any edge effects. The central pvc band is then peeled from the glass strip at 180° and a parting speed of 30 cm/minute using an Instron or similar machine. The resistance, measured in g/cm is a measure of the bond strength.

Driness. The level of "driness" of the bond is determined by observing the performance of the bond during the Peel Test referred to above and is classified as either A, B or C. The highest level of "driness", level A, is where during the Peel test the components of the laminate part very suddenly and completely when a certain level of parting force is reached. The next level, level A-B, is where the force required to part the components at 30 cm/minute in the Peel Test varies during the test and/or from test to test. A lower level of "driness", level B, is where the force required for the Peel Test does not vary significantly during the Peel Test and is substantially unchanged over a series of tests but is significantly lower when the components of the laminate are parted sharply by hand. Where there is no significant lowering of the bond strength in the test, "driness" is considered absent, and the bond is said to be "soft" or "supple". This is level C.

Cure time. Time taken to cure the composition when employed as a layer between the pvc film used in the 'Bond Strength' test and a 3 mm thick sheet of float glass and irradiated through the glass sheet using a 1 kw u.v. radiation source having a wavelength of approximately 10 cm and spaced 40 cm from the surface of the glass sheet.

All the compositions described in the Examples had a viscosity below about 2000 cp, a shelf life of at least several months and could be cured within a few seconds or a minute at the most to colourless clear and transparent flexible films which bond well to a variety of plastics materials and have a refractive index close or equal to that of glass.

EXAMPLE 1

Adhesive compositions A, B and C were prepared having the following compositions and tested for bond strength, water resistance and u.v. resistance. The results are shown in Table 1.

|  | A (Comparative) | B | C |
| --- | --- | --- | --- |
| Urethane acrylate | 58.0 | 58.0 | 58.0 |
| acrylic acid | 38.8 | 29.1 | 19.4 |
| n-butyl acrylate | nil | 9.7 | 19.4 |
| DMAEMA* | 1.6 | 1.6 | 1.6 |
| benzophenone | 1.6 | 1.6 | 1.6 |

*DMAEMA is N,N—dimethylaminoethyl methacrylate

The urethane acrylate was a low melting point solid containing 0.4–0.5 eq/kg unsaturation and marketed as Oligomer AJ 17 by SNPE, France. Analysis showed it to contain residues of ethylene glycol, propylene-1, 2-glycol, adipic acid, acrylic acid and toluene-2, 4-diisocyanate (TDI), and to have a molecular weight $M_N$ of about 5000–5500.

TABLE 1

| Composition | bond strength (g/cm) | u.v. resistance | water resistance |
| --- | --- | --- | --- |
| A (Comparative) | 400 | 2.5 | 2 |
| B | 1000 | 2 | 3 |
| C | 1300 | 1.5 | 3 |

EXAMPLE 2

Compositions corresponding to C of Example 1, were prepared but wherein the n-butyl acrylate was replaced by the acrylate identified in the Table below and, as the urethane acrylate, a material was used having a molecular weight of 1500, containing on average 2 αβ-ethylenically unsaturated groups per molecule and available as Ebecryl 210 from UCB, Belgium. On analysis, this material was found to contain residues from poly(oxypropylene)glycol, acrylic acid and TDI. The results were as follows:

| Composition | acrylate ester | bond strength (g/cm) | u.v. resistance | water resistance |
| --- | --- | --- | --- | --- |
| D | glycidyl acrylate | 180 | 2 | 3 |
| E | 2-ethoxyethyl acrylate | 500 | 4 | 4–5 |
| F | t-butyl acrylate | 100–650 | 4 | 2–3 |
| G (Comparative) | 2-ethylhexyl acrylate | nil | — | — |
| H (Comparative) | dodecyl acrylate | nil | — | — |

The relatively low values recorded for bond strength, as compared with those recorded for Composition C, are believed to be due, at least in part, to the low molecular weight of the urethane acrylate.

EXAMPLE 3

Compositions J, K and L, corresponding to A, B and C of Example 1 were prepared but using as the urethane acrylate a material having a molecular weight of 5000, and containing on average 2 $\alpha\beta$-ethylenically unsaturated groups per molecule and available as Ebecryl 230 from UCB, Belgium. On analysis, this material was found to contain residues from poly(oxypropylene)-glycol, hexamethylene diisocyanate (HMDI) and acrylic acid. The results were as follows:

| Composition | bond strength (g/cm) | u.v. resistance | water resistance |
|---|---|---|---|
| J (Comparative) | 140–180 | 0 | 2–3 |
| K | 480 | 0 | 4 |
| L | 650 | 0 | 4–5 |

It will be seen that in this case, where the urethane acrylate is derived from a polyether polyol and an aliphatic diisocyanate, excellent u.v. resistance is observed and the addition of the butyl acrylate improves both water resistance and bond strength.

EXAMPLE 4

To examine the effect of varying the concentration of the acrylate ester in the diluent, a series of adhesive compositions were prepared from 57 parts of Ebecryl 230, 2.5 parts of benzophenone and 38.5 parts of a diluent comprising acrylic acid and n-butyl acrylate employed in the concentrations shown in the Table below in which the bond strength, bond type and water resistance of the compositions are also recorded.

| Composition | Acrylic acid* | n-butyl acrylate* | Bond strength (g/cm) | Driness of bond | Water resistance |
|---|---|---|---|---|---|
| M (Comparative) | 0 | 38.5 | negligible | — | 1 |
| N | 9 | 29.5 | ~250 | C | ~3.5 |
| P | 13 | 25.5 | ~450 | B–C | ~4 |
| R | 17 | 21.5 | ~700 | B–C | ~4.5 |
| S | 21 | 17.5 | ~1400 | B | ~5.5 |
| T | 29 | 9.5 | ~650 | A–B | ~3–4 |
| V | 38.5 | 0 | negligible | A | 1.4 |

*(parts by weight)

The viscosity of Composition T was measured as 700 cp on a Brookfield LV viscometer with No. 1 spindle at 6 rpm at 20° C. This viscosity was unchanged after four months storage.

The u.v. resistance of the same composition was found to be 0 on the scale.

EXAMPLE 5

As a test of the suitability of the compositions in the production of safety laminates, glass/pvc/glass laminates formed using as adhesive layers compositions N,P,R and S were subjected within a few hours of preparation to a falling ball test as follows. A 2.06 Kg ball was dropped repeatedly from a height of 3 m on to a face of a 50.6 cm×50.6 cm laminate made using the adhesive and comprising a 0.76 mm film of "Vibak" VB 24 (a pvc film marketed by Storey Brothers of U.K.) between two 4 mm glass sheets.

In each case, it required 6–8 impacts before the ball passed through the laminate and detailed comments are as follows.

| Composition | Comments |
|---|---|
| N | No sign of driness but a small amount of glass on opposite side from impact falls away on 1st impact. More obvious on second impact. |
| P | As N but less glass falls away. |
| R | Some signs of delamination appear during test and more glass falls away after impact than in P. |
| S | Less satisfactory than R. Delamination appears along line of fracture on 1st impact. |

EXAMPLE 6

Composition T was modified by the addition of 2 parts of a composition comprising about 65% by weight urethane acrylate oligomer in about 35% by weight low molecular weight material as diluent, and available as Actomer X-117 from Union Carbide Corporation of U.S.A. This material is described as having a theoretical molecular weight of 2020 and a theoretical acrylate functionality of 2.2. By analysis, the oligomeric portion was found to have an $M_N$ of about 3500, to contain residues of caprolactone-derived polyol, isophorone diisocyanate ethylene glycol and acrylic acid and to consist largely of oligomers having at least 3 $\alpha\beta$-ethylenically unsaturated groups per molecule. The low molecular weight material analysed as mainly N-methyl carbamoyl ethyl acrylate (MCEA) together with a small amount of the diurethane obtainable by the reaction of two moles of isophorone diisocyanate with a mole of hydroxyethyl acrylate.

The water resistance, u.v. resistance, viscosity and reactivity of this composition were found to be substantially the same as those for Composition T but the bond strength was increased at about 2100 g/cm.

Glass/pvc/glass laminates were prepared from the composition and subjected to the "falling ball" test described in Example 5.

The average number of strikes required before the ball passed completely through the laminate was 7–8 and in some samples the number of strikes exceeded 10, reflecting very high impact resistance.

It was also observed that when the glass shattered, the fragments and splinters largely remained firmly adhered to the interlayer and little, if any, glass separated.

When the test was repeated with the laminate heated to 40° C., the average number of strikes required was about 5–6.

Similar results were obtained in two further tests when the amount of additive was altered from 2 parts to 5 parts and 10 parts, respectively.

By way of comparison, the same test was also applied to samples 1 of commercially available laminated glass and the results are tabulated below.

| Type of Laminated Glass | Average number of strikes required before ball passed completely through laminate |
|---|---|
| A. 4 mm glass/0.76 mm interlayer/ 4 mm glass, sold commercially as "KINON" | 5 |

| Type of Laminated Glass | Average number of strikes required before ball passed completely through laminate |
|---|---|
| B. 4 mm glass/0.76 mm interlayer/ 4 mm glass, sold commercially as "SIV" | 4 |

In both the above cases, when the test was repeated at 45°–50° C., the ball passed through the laminate on the first drop because of the loss of strength of the polyvinyl butyral interlayer at this temperature.

EXAMPLE 7

Results similar to those obtained in Example 6 were obtained when the Actomer X-117 was replaced with corresponding amounts of Actomer X-118 and of Genomer T-1600.

Actomer X-118 is described as a urethane acrylate oligomer material solution in a mixture of acrylate monomers of which the major part has a low molecular weight urethane structure. Its theoretical molecular weight is reported as 2122 and its theoretical functionality (i.e. number of $\alpha\beta$-ethylenically unsaturated groups per molecule) as 2.2. Analysis showed the oligomeric component to contain residues of caprolactone-derived polyol, isophorone diisocyanate, ethylene glycol and acrylic acid, to have an $M_N$ of about 5350 and to consist largely of oligomer having 3 or more $\alpha\beta$-ethylenically unsaturated groups per molecule. The low molecular weight material was found to comprise largely MCEA.

Genomer T-1600, which is available from Rahn of Switzerland, is a urethane acrylate having approximately three $\alpha\beta$-ethylenically unsaturated groups per molecule and a molecular weight $M_N$ of about 1600. Analysis showed it to contain residues of polycaprolactone polyol as well as acrylic acid and isocyanate.

EXAMPLES 8 and 9

The following Examples illustrate the inclusion of a polyester containing terminal unsaturation in the oligomeric component.

| | Example | |
|---|---|---|
| | 8 | 9 |
| Ebecryl 230 | 50 | 50 |
| Polyester | 30 | 30 |
| AA | 13 | 13 |
| n-Bu A | 0 | 5 |
| HEA | 5 | 0 |
| Benzophenone | 2 | 2 |
| water resistance | 3 | 3 |
| adhesion (g/cm) | 320 | 180 |

AA is acrylic acid
n-Bu A is n-butyl acrylate
HEA is hydroxyethyl acrylate

The polyester employed was a polyester acrylate having a molecular weight $M_N$ of about 1000 and a functionality of 4 and is available as Ebecryl 810 from UCB, Belgium.

In further experiments there was used, instead of the unsaturated polyester resin, Epikote 834 of Shell Chemicals which is a saturated epoxy resin derived from bisphenol-A and epichlorhydrin.

EXAMPLES 10–16

Example 6 was repeated but with varying proportions of acrylic acid and n-butyl acrylate. The full results are set out below. In Example 10, in which no acrylate is present, the water resistance is adequate. In Example 16, in which no acrylic acid is present, the bond strength is too low to measure.

| | Example | | | | | | |
|---|---|---|---|---|---|---|---|
| | 10 (Comparative) | 11 | 12 | 13 | 14 | 15 | 16 (Comparative) |
| Acrylic Acid (parts) | 38.5 | 33 | 27.5 | 18.5 | 14 | 9.5 | 0 |
| n-Butyl Acrylate (parts) | 0 | 5.5 | 11.0 | 20 | 24.5 | 29.0 | 38.5 |
| Water Resistance | <2 | 3.5 | 4.5–5 | 4.5–5 | 4 | 2.5 | n.m. |
| Cure Time (secs) | 30 | n.m. | n.m. | 40–50 | n.m. | 40–50 | n.m. |
| Bond Strength (g/cm) | 1300 | 1600 | 2400 | 2000 | 600 | 400 | negligible | n.m. means "not measured"
Comments on the performance in the Peel Test of bonds formed using the above compositions:
Example 10: Difficult to record bond strength because measurements vary substantially from test to test and during each test. Bond strength drops sharply if parting is rapid.
Example 11: Similar to 10.
Example 12: Similar to 10.
Example 13: Parting force fairly uniform at parting rate of 30 cm$^{-1}$ sec. Some drop in bond strength if parted by sharp manual movement.
Example 14: Parting force constant at 30 cm sec$^{-1}$ and no drop in bond strength if parted sharply.
Example 15: As 14 but bond strength barely adequate.

EXAMPLE 17

A composition was prepared from 55.3 parts of Ebecryl 230, 4.9 parts of Actomer X-117, 28.1 parts acrylic acid, 9.2 parts ethyl acrylate and 2.5 parts benzophenone. It was found to have a bond strength of >2000 g/cm and a water resistance of 2.

EXAMPLE 18

The composition of Example 17 was modified by replacing the ethyl acrylate by an equal amount of n-butyl acrylate. The resultant composition was found to have a bond strength of >2200 g/cm, a bond driness of C, a water resistance of about 5.5–6, a u.v. resistance of 0 and a cure time of about 25 seconds.

EXAMPLES 19–27

Varying amounts of the combination of acrylic acid and n-butyl acrylate of the composition of Example 18 were replaced by pro rata amounts of a multiacrylate with the results shown below. In each case, each 4 parts of multiacrylate replaced 3 parts of the acrylic acid and 1 part of the n-butyl acrylate, so that the ratio of acrylic acid:n-butyl acrylate remained substantially constant.

|  | Example No. | | | | | | | | |
|---|---|---|---|---|---|---|---|---|---|
|  | 19 | 20 | 21 | 22 | 23 | 24 | 25 | 26 | 27 |
| Nature of multiacrylate | NPGDA* | NPGDA | NPGDA | PETA* | PETA | PETA | PETEA* | PETEA | PETEA |
| Proportion of multiacrylate in diluent | 10% | 20% | 40% | 10% | 20% | 40% | 10% | 20% | 30% |
| Bond strength (g/cm) | 2150 | 1650 | 850 | 1650 | 1300 | 450 | 2000 | 1200 | 700 |

*NPGDA is neopentylglycol diacrylate
*PETA is pentaerithrytol triacrylate
*PETEA is pentaerythritol tetra acrylate

EXAMPLE 28

The composition of Example 18 was modified by the inclusion of 5 parts of a balsamic resin sold as ABITOL by Hercules NV of Netherlands. A sample of the formulation was then employed to fill the space between two 3 mm thick glass sheets spaced 0.75 mm apart and cured and the resultant laminate was exposed to the light of a 1 Kw high pressure mercury lamp. After 186 hours continuous exposure, the cured composition was still water-white. When the experiment was repeated using the formulation of Example 18, the cured composition turned a very pale straw colour after 186 hours exposure.

EXAMPLES 29 AND 30

Example 28 was repeated but using 2.5 parts of balsamic resin (Example 29) and 10 parts of balsamic resin (Example 30). An improvement in aging was observed in Example 29 but the results were not quite as good as Example 28. In Example 30, the improvement over Example 28 was barely perceptible.

EXAMPLES 31 AND 32

Example 28 was repeated but replacing the ABITOL with corresponding amounts of other balsamic resins, namely Staybelite Ester 3 (Example 29) and Hercolyn (Example 30), with the same results.

EXAMPLES 33 TO 37

Example 28 was repeated but with the basic formulation of Example 18 replaced by other urethane acrylate-based formulations identified in the Table below which also reports the results obtained.

| | | Ageing result (colour) | |
|---|---|---|---|
| Example | Basic formulation | Without ABITOL | With 5% ABITOL |
| 33 | Loctite 357 adhesive | Yellow-brown | Less dark |
| 34 | Loctite 580 adhesive | Straw yellow | Pale straw yellow |
| 35 | Loctite 358 adhesive | Straw yellow | Pale straw yellow |
| 36 | As Example 18 but with the Ebecryl 230 replaced by Ebecryl 220 | Yellow | Pale yellow |
| 37 | As Example 18 but with the Ebecryl 230 replaced by Ebecryl 210 | Yellow | Straw yellow |

EXAMPLE 38

Example 28 was repeated but replacing the benzophenone with an equal weight of Darocure. With the balsamic resin, the cured composition turned pale yellow-brown. With the balsamic resin, the end colour was a paler yellow brown.

As many changes can be made to the constituents of the examples without departing from the scope of the invention, it is intended that all matter contained in the examples be interpreted as illustrative of the invention and not in a limiting sense.

The embodiments of the invention in which an exclusive property or privilege is claimed are as follows:

1. A radiation-curable clear homogeneous fluid adhesive composition for the production of clear glass laminate comprising (a) a urethane acrylate component in (b) liquid α,β-ethylenically unsaturated diluent component;

said urethane acrylate component comprises at least one urethane acrylate having an average of at least about 2 α,β, ethylenically unsaturated groups per molecule and being obtainable by reaction of an oligomeric urethane intermediate having end groups selected from the —OH and —NCO with an α,β,-ethylenically unsaturated compound which has a group reactive with an end group of the intermediate and also a carboxy (—COO) group attached to a carbon atom which is attached to a methylene group by a double bond, and not less than a major proportion of said urethane acrylate component is formed of material having a molecular weight ($M_N$) above 1500, and substantially all of the unsaturation in the urethane acrylate is terminal alpha, beta-unsaturation, said diluent component comprises (i) acrylic acid, (ii) an effective amount of at least one acrylate selected from the group consisting of monoesters of acrylic acid and alkanols having from 1 to 6 carbon atoms and substituted derivatives of such alkanols wherein each substituent contains only carbon, hydrogen and oxygen atoms, said component (i) being present in an amount of from 35% to 90% by weight, based on the total weight of component (i) and component (ii), and components (i) and (ii) form more than 50% of the diluent, (iii) from 0% to about 40% by weight based on the weight of the diluent of a multiacrylate selected from the group consisting of the di- and higher esters of acrylic acid with polyhydric alcohols; and said urethane acrylate component forms 45% to 75% by weight of the mixture of urethane acrylate and diluent, and the diluent forms from 55% to 25% by weight of said mixture.

2. A composition as claimed in claim 1 wherein said at least one acrylate is selected from the group consisting of monoesters of acrylic acid with alcohols having the structure

wherein R is selected from the group consisting of —H, —OH and monovalent organic groups containing atoms selected only from the group consisting of carbon, oxygen and hydrogen, and having not more than 4 atoms in a chain attached to the free valency, and each R' is individually selected from —H and —CH$_3$, or R and R' together may form a divalent group containing atoms selected only from the group consisting of carbon, hydrogen and oxygen, the sum of the carbon and oxygen atoms in said alcohol being from 4 to 7.

3. A composition as claimed in claim 1 in which the acrylate is n-butyl acrylate.

4. A composition according to claim 1 wherein the urethane acrylate component is derived from polyol not less than a major proportion of which is polyol containing ether groups.

5. A composition according to claim 4 wherein the polyol from which the urethane acrylate component is derived is free or substantially free from ester groups.

6. A composition according to claim 1 in which the acrylate is present in an amount of at least 25% by weight, based on the combined weight of acrylate and acrylic acid.

7. A composition according to claim 6 in which the acrylate is present in an amount of at least about 35% by weight, based on the combined weight of acrylic acid and acrylate.

8. A composition according to claim 4 in which the acrylate is present in an amount of from about 40% to about 65% by weight, based on the combined weight of acrylic acid and acrylate.

9. A composition according to claim 1 wherein the urethane acrylate component forms from about 50 to about 70% by weight of the composition.

10. A composition according to claim 1 wherein the urethane acrylate component has on average about 2 $\alpha\beta$-ethylenically unsaturated groups per molecule.

11. A composition according to claim 1 wherein the urethane acrylate component has on average about 1.7 to about 2.3 $\alpha\beta$-ethylenically unsaturated groups per molecule.

12. A composition according to claim 1 wherein the urethane acrylate component is derived from polyisocyanate at least most of the isocyanate groups of which are attached to aliphatic carbon atoms.

13. A composition according to claim 1 wherein the urethane acrylate oligomer component comprises a mixture of (aa) generally difunctional urethane acrylate material and (ab) urethane acrylate which has a functionality of at least about 3 and a molecular weight M$_N$ of at least about 1300.

14. A composition according to claim 13 in which component (aa) is present in the mixture in a major amount.

15. A composition as claimed in claim 14 in which component (aa) comprises urethane acrylate oligomer containing about 2 $\alpha\beta$-ethylenically unsaturated groups per molecule, and which contains ether groups in the oligomer or polymer chains.

16. A composition as claimed in claim 15 in which component (aa) is derived from polyol not less than a major proportion of which is polyether polyol and is at least substantially free of ester groups.

17. A composition as claimed in claim 13 in which component (ab) is derived from polyol not less than a major porportion of which is polyester polyol.

18. A composition as claimed in claim 17 in which component (ab) is derived from polyol which is derived from lactone.

19. A composition as claimed in claim 18 wherein the lactone comprises caprolactone.

20. A composition as claimed in claim 13 in which both component (aa) and (ab) are derived from polyisocyanate not less than a major proportion of the isocyanate groups of which are attached to aliphatic carbon atoms.

21. A composition as claimed in claim 13 wherein component (ab) forms from about 0.5% to about 30% by weight of the total urethane acrylate oligomer.

22. A composition as claimed in claim 1 which includes a photoinitiator and is curable by ultra-violet irradiation.

23. A composition as claimed in claim 1 further including at least one further resinous material.

24. A composition as claimed in claim 23 in which said further resinous material is selected from epoxy resins and hydrogenated resinic acids and colophony esters.

25. A composition as claimed in claim 1 in which said further resinous material forms up to 50% by weight of the composition.

26. A composition as claimed in claim 1 in which said further resinous material is resin selected from the group consisting of hydrogenated resinic acids and colophony esters.

27. A composition as claimed in claim 1 in which the acrylic acid forms at least 50% by weight of the $\alpha\beta$-ethylenically unsaturated carboxylic acid content of the diluent.

28. A composition as claimed in claim 1 which contains not more than 5% by weight of $\alpha\beta$-ethylenically unsaturated compound capable of forming a salt with acrylic acid.

29. A composition as claimed in claim 1 in which multiacrylate forms from 0 to 30% by weight of the diluent.

30. A composition as claimed in claim 1 having a viscosity of 300 to 1200 cp as measured at 20° C. on a Brookfield LV viscometer using a No. 1 spindle at 6 rpm, a bond strength in the cured state of at least about 300 g/cm and a bond "driness" of C as herein described.

31. A composition as claimed in claim 1 having a bond strength as herein defined of at least 500 g/cm.

32. A composition as claimed in claim 1 which includes a photo-initiator and wherein
the urethane acrylate component is oligomeric and comprises a mixture of
(aa) generally difuctional urethane acrylate material containing about 2 $\alpha\beta$-ethylenically unsaturated groups per molecule and derived from polyol not less than a major amount of which is polyether polyol and is substantially free of ester groups and polyisocyanate not less than a major proportion of the isocyanate groups of which are attached to aliphatic carbon atoms, and
(ab) urethane acrylate having a functionality of at least 3 and a molecular weight M$_N$ of at least about 1300 and derived from polyol which is derived from caprolactone and polyisocyanate not less than a major proportion of the isocyanate groups of which are attached to aliphatic carbon atoms;
component (ab) forms about 0.5% to about 30% by weight of the urethane acrylate component;

the acrylic acid and acrylate together form at least 50% by weight of the diluent with the acrylate present in an amount of from 40% to 65% by weight, based on the combined weight of acrylate and acrylic acid;

the urethane acrylate component forms from 45 to 75% by weight of the composition; and said composition also containing a resinous material selected from the group consisting of hydrogenated resinic acids and colophony esters in an amount of from 0 to 10% by weight of the composition.

* * * * *